United States Patent
Yuan

(10) Patent No.: US 7,567,395 B2
(45) Date of Patent: Jul. 28, 2009

(54) LENS MODULE ASSEMBLY AND IMAGING SYSTEM HAVING SAME

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/617,612

(22) Filed: Dec. 28, 2006

(65) Prior Publication Data
US 2008/0100933 A1    May 1, 2008

(30) Foreign Application Priority Data
Oct. 27, 2006   (CN) .................... 2006 1 0063343

(51) Int. Cl.
G02B 7/02 (2006.01)
G03B 13/00 (2006.01)

(52) U.S. Cl. .................. 359/820; 359/643; 359/676; 396/97; 355/67; 348/345

(58) Field of Classification Search ............... 359/820, 359/356, 643, 676, 683, 789, 790; 355/27, 355/44, 67, 77; 358/406, 474, 475, 487; 348/144, 345, 360, E5.038, E5.045, E5.046, 348/E5.027, E5.028; 396/42, 79, 97, 430, 396/603, 626; 374/129; 250/201.1, 230, 250/237 G; 235/462.46, 472.02
See application file for complete search history.

(56) References Cited

U.S. PATENT DOCUMENTS

| | | | | |
|---|---|---|---|---|
| 2,856,829 A * | 10/1958 | Orlando | ................... | 396/42 |
| 3,205,774 A * | 9/1965 | Estes | ................... | 359/789 |
| 4,120,200 A * | 10/1978 | Braun | ................... | 374/129 |
| 4,867,574 A * | 9/1989 | Jenkofsky | ................... | 374/121 |
| 5,124,738 A * | 6/1992 | Yamashita | ................... | 355/56 |
| 5,313,333 A * | 5/1994 | O'Brien et al. | ................... | 359/820 |
| 5,679,946 A * | 10/1997 | Mukai et al. | ................... | 250/201.2 |
| 5,883,704 A * | 3/1999 | Nishi et al. | ................... | 355/67 |
| 6,467,952 B2 * | 10/2002 | Morisaki et al. | ................... | 374/129 |
| 6,603,614 B2 * | 8/2003 | Fulkerson et al. | ................... | 359/820 |
| 6,717,755 B1 * | 4/2004 | Katzman | ................... | 359/820 |
| 6,729,143 B1 * | 5/2004 | Watts et al. | ................... | 62/3.2 |
| 6,954,292 B2 * | 10/2005 | Inoue | ................... | 358/475 |
| 7,031,071 B2 * | 4/2006 | Nishioka | ................... | 359/676 |
| 7,031,083 B2 | 4/2006 | Chen | | |
| 7,110,667 B2 * | 9/2006 | Nakazawa | ................... | 396/97 |
| 7,408,728 B2 * | 8/2008 | Bloch et al. | ................... | 359/820 |
| 2004/0223074 A1 * | 11/2004 | Takada | ................... | 348/360 |
| 2007/0063048 A1 * | 3/2007 | Havens et al. | ................... | 235/462.46 |
| 2007/0080280 A1 * | 4/2007 | Havens | ................... | 250/201.1 |

FOREIGN PATENT DOCUMENTS

| | | |
|---|---|---|
| CN | 2384239 | 6/2000 |
| CN | 1707300 | 12/2005 |
| JP | 8-334666 | 12/1996 |
| JP | 8-340482 A * | 12/1996 |
| JP | 2005-338433 A * | 12/2005 |

* cited by examiner

*Primary Examiner*—Loha Ben
(74) *Attorney, Agent, or Firm*—Andrew C. Cheng

(57) ABSTRACT

A lens module assembly and an imaging system are disclosed. The imaging system includes the lens module assembly and an image sensor received in the assembly. The lens module assembly includes a lens module, and a temperature regulator disposed on the lens module. The temperature regulator is configured for keeping temperature of the lens module within a predetermined range so as to ensure image quality of the lens module.

19 Claims, 5 Drawing Sheets

LENS MODULE ASSEMBLY AND IMAGING SYSTEM HAVING SAME

TECHNICAL FIELD

The present invention relates to camera modules and, more particularly, to lens module assemblies and imaging systems having the lens module assemblies.

BACKGROUND

Currently, camera modules are included as a feature in a wide variety of portable electronic devices. Most portable electronic devices are becoming progressively more miniaturized over time, and camera modules are correspondingly becoming smaller and smaller. Nevertheless, consumers still demand excellent image quality.

A typical camera module includes a lens module and an image sensor. The lens module includes a lens barrel, at least one optical elements received in the lens barrel, and a lens holder. The lens barrel is partially received in the lens holder. The image sensor is received in the lens holder. In order to ensure image quality of the lens module, the optical element performs typically needs to undergo a variety of precision machining processes to obtain desired optical surface, shape, and surface microstructure. The optical elements are then assembled into the lens barrel according to a predetermined compact arrangement.

In fact, the lens module, particularly optical elements, are arranged and assembled on the basis of a general environment, for example, normal temperature and atmosphere. However, the outside environment in real life is variable, and thus varying operating environment of the camera module. For example, in a cold situation, the camera module is subject to a lower temperature environment. Due to thermal condensation effect, original compact arrangement and microstructure of the optical elements are destroyed to a certain extent, thus leading to engagement flaws. This results in a relatively lower imaging quality. At the same time, due to the lower temperature environment, a certain amount of vapor condenses into water droplets on surfaces of the optical elements. The water droplets have a destructive influence on the imaging quality.

Furthermore, the effective refractive index of the optical elements varies with the temperature thereof. Thus, in cold situations, the effective refractive index of the optical elements is lowered by the lower outside temperature. Accordingly, the optical imaging system of the camera module might deviate from predetermined design thereby producing undesirable difficulty for the user to take pictures.

What is needed, therefore, is a lens module assembly that has a relatively stable imaging effect conforming to variation of outside temperature environments.

What is needed, also, is an imaging system having the desired lens module assembly.

SUMMARY

In accordance with a preferred embodiment, a lens module assembly includes a lens module, and a temperature regulator disposed on the lens module. The temperature regulator is configured for keeping a temperature of the lens module within a predetermined range so as to ensure image quality of the lens module.

An imaging system includes the lens module assembly and an image sensor received in the assembly. The lens module assembly includes a lens module, and a temperature regulator disposed on the lens module. The temperature regulator is configured for keeping temperature of the lens module within a predetermined range so as to ensure image quality of the lens module.

Other advantages and novel features will be drawn from the following detailed description of preferred embodiments in conjunction with the attached drawings.

BRIEF DESCRIPTION OF THE DRAWINGS

Many aspects of the present lens module assembly and imaging system can be better understood with reference to the following drawings. The components in the drawings are not necessarily drawn to scale, the emphasis instead being placed upon clearly illustrating the principles of the present lens module assembly and imaging system. Moreover, in the drawings, like reference numerals designate corresponding parts throughout the several views.

DETAILED DESCRIPTION OF THE PREFERRED EMBODIMENTS

Embodiments of the present lens module assembly and imaging system will now be described in detail below and with reference to the drawings.

Figure 1:
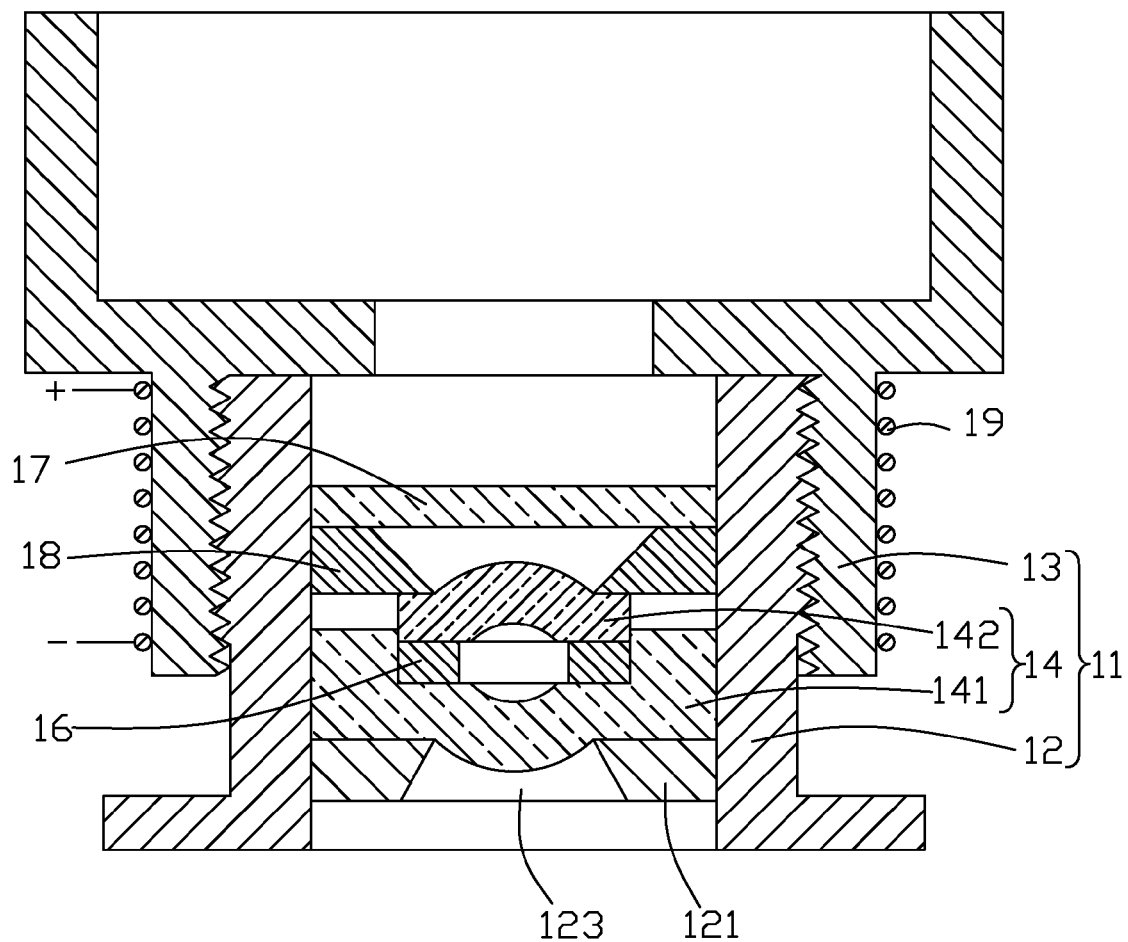
FIG. 1 is a schematic, cross-sectional view of a lens module assembly, according to a first preferred embodiment.

FIG. 1 illustrates a lens module assembly 10, in accordance with a first preferred embodiment. The lens module assembly 10 includes a lens module 11 and a temperature regulator 19. The lens module 11 includes a lens barrel 12, a lens holder 13, and an optical assembly 14.

The lens barrel 12 is received in the lens holder 13. For example, the lens barrel 12 is partially screwed into the lens holder 13, as shown in FIG. 1. As such, the lens barrel 12 is partially threadedly received in the lens holder 13. The lens barrel 12 has a cover ring 121 defining a conical light entrance 123 therein. The cover ring 121 is a ring-shaped projection extending from an interior wall of the lens barrel 12. The lens barrel 12 and the lens holder 13 are advantageously made of a thermally conductive material selected from a group consisting of: copper, aluminum, carbon fiber, and polymer doped with thermally conductive metal (e.g., copper or aluminum).

The optical assembly 14 can include a first optical element 141 and a second optical element 142. The first optical element 141 is advantageously adjacent to the cover ring 121. The first and second optical elements 141, 142 are spaced apart by a first spacer 16. The first and second optical elements 141, 142 are advantageously made of a transparent material, for example, glass, plastic, optical polymer, etc. It is to be noted that although two optical elements are exemplarily illustrated herein, one or more than two optical elements may be optionally employed in the application of the present lens module assembly 10.

Preferably, an optical filter 17 is received in the lens barrel 12. The optical filter 17 is configured for selectively allowing the pass of light in a predetermined bandwidth, for example, visible light. The optical filter 17 is advantageously adhered to a second spacer 18. The second spacer 18 is interposed between the optical filter 17 and the second optical elements 142.

The temperature regulator 19 is disposed on a periphery of the lens holder 13. The temperature regulator 19 can, advantageously, include a heating member. The heating member can be an electronic heater, for example, a resistance coil. The resistance coil can be coiled on and around the periphery of the lens holder 13, i.e., on and around an outer wall of the lens holder 13. The temperature regulator 19 is configured for keeping a temperature of the lens module 11 within a predetermined range. The predetermined range is advantageously in the range from about 10° C. to about 60° C., and preferably in the range from about 20° C. to about 60° C. Accordingly, even if the lens module assembly 10 is used in a lower temperature environment, the temperature regulator 19 can heat the lens holder 13 to a desired temperature. Thus, an original compact arrangement and microstructure of the first and second optical elements 141, 142 are properly maintained, thereby ensuring image quality of the lens module 11. Likewise, the refractive indexes of the two optical elements 141, 142 are also essentially maintained at constants. Therefore, due to the control of the temperature regulator 19, the image quality of the lens module assembly 10 can be ensured and is not subject to the variation of outside temperature.

Figure 2:
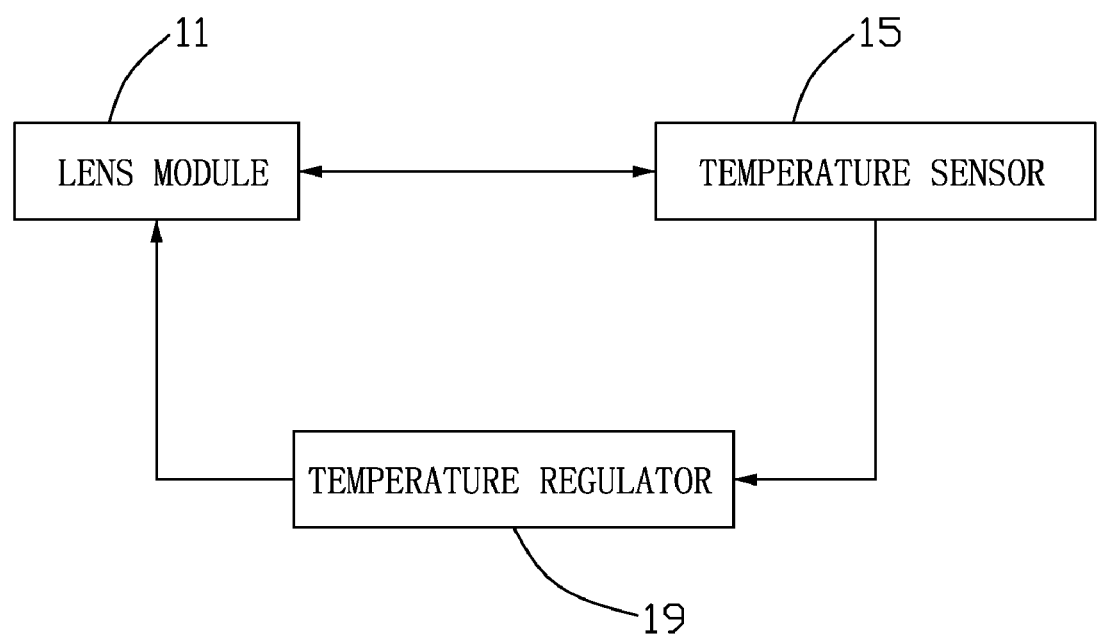
FIG. 2 is a schematic, block diagram view of the lens module assembly of FIG. 1, showing function relationships between components of the lens module assembly.

Referring to FIG. 2, a temperature sensor 15 is advantageously applied in the lens module assembly 10. The temperature sensor 15 is electrically connected to the heating member, i.e., the electronic heater of the temperature regulator 19. The temperature sensor 15 is thermally coupled to the lens module 11 to detect the temperature of the lens module 11 and receive a feedback temperature, i.e., detected temperature, of the lens module 11. Accordingly, the temperature sensor 15 is configured for detecting the temperature of the lens module 11 and transmitting an operating instruction (i.e., signal) to the electronic heater (i.e., temperature regulator 19) based on the detected temperature of the lens module 11. For example, when the detected temperature of the lens module 11 is beyond the predetermined range, the temperature sensor 15 transmits a heating instruction (i.e., signal) to the temperature regulator 19. The temperature regulator 19 then heats the lens module 11 according to the heating instruction until receiving a stop instruction from the temperature sensor 15.

Figure 3:
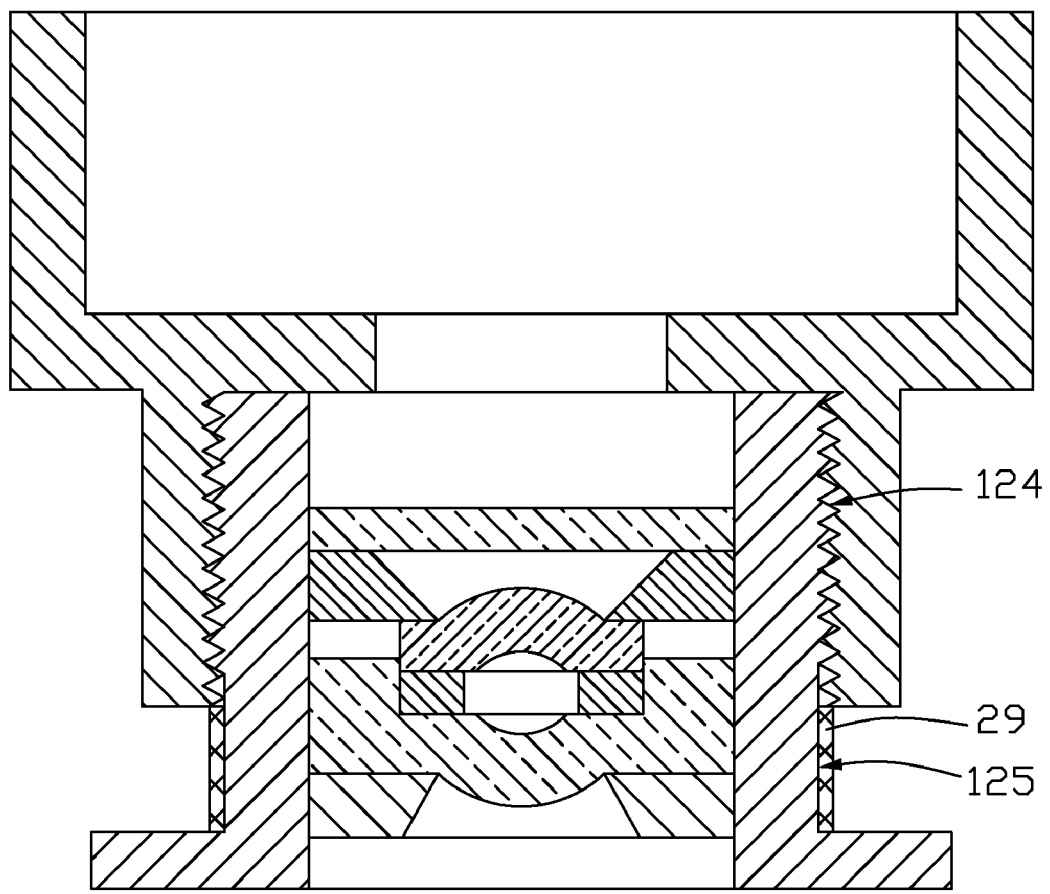
FIG. 3 is a schematic, cross-sectional view of another lens module assembly, according to a second preferred embodiment.

FIG. 3 illustrates an alternative lens module assembly 20, in accordance with a second preferred embodiment. The lens module assembly 20 is essentially similar to the lens module assembly 10 except that the temperature regulator 29 is disposed on the lens barrel 12. In the illustrated embodiment, the lens barrel 12 has a screwed region 124 and a planar region 125 at a periphery thereof. The screwed region 124 defines a plurality of screw threads engaged with a plurality of screw threads defined in an inner wall of the lens holder 13. The temperature regulator 29 is usefully disposed on and around an outer wall of the lens barrel 12 at the planar region 125. The temperature regulator 29 advantageously includes a heating sheet attached to around an outer wall of the lens barrel 12 at the planar region 125, e.g., via an adhesive.

Figure 4:
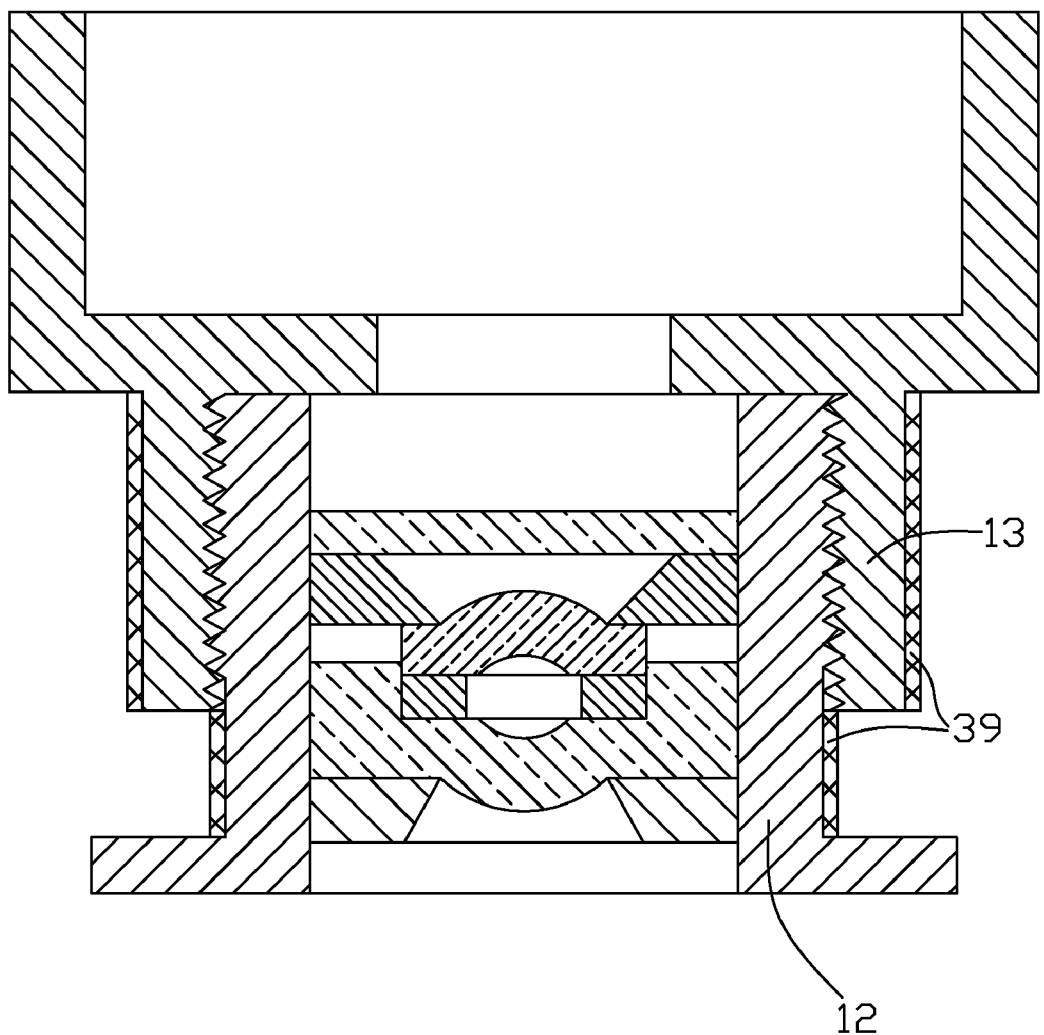
FIG. 4 is a schematic, cross-sectional view of another alternative lens module assembly, according to a third preferred embodiment.

FIG. 4 illustrates another alternative lens module assembly 30, in accordance with a third preferred embodiment. The lens module assembly 30 is essentially similar to the lens module assemblies 10 or 20 except that the temperature regulator 39 includes two heating members respectively disposed on and around the lens holder 13 and the lens barrel 12. The heating members can be electronic heaters or heating sheets.

Alternatively, the temperature regulator 39 may include other types of heating members, such as, for example, a snake-shaped heating conduit. The snake-shaped heating conduit is coiled around the periphery of the lens holder 13 or the lens barrel 12. An amount of liquid medium is contained and circulates in the heating conduit. The liquid medium contained in the heating conduit can be heating medium for heating the lens module of the lens module assembly 30 or cooling medium for cooling the lens module of the lens module assembly 30 by heat exchange.

Figure 5:
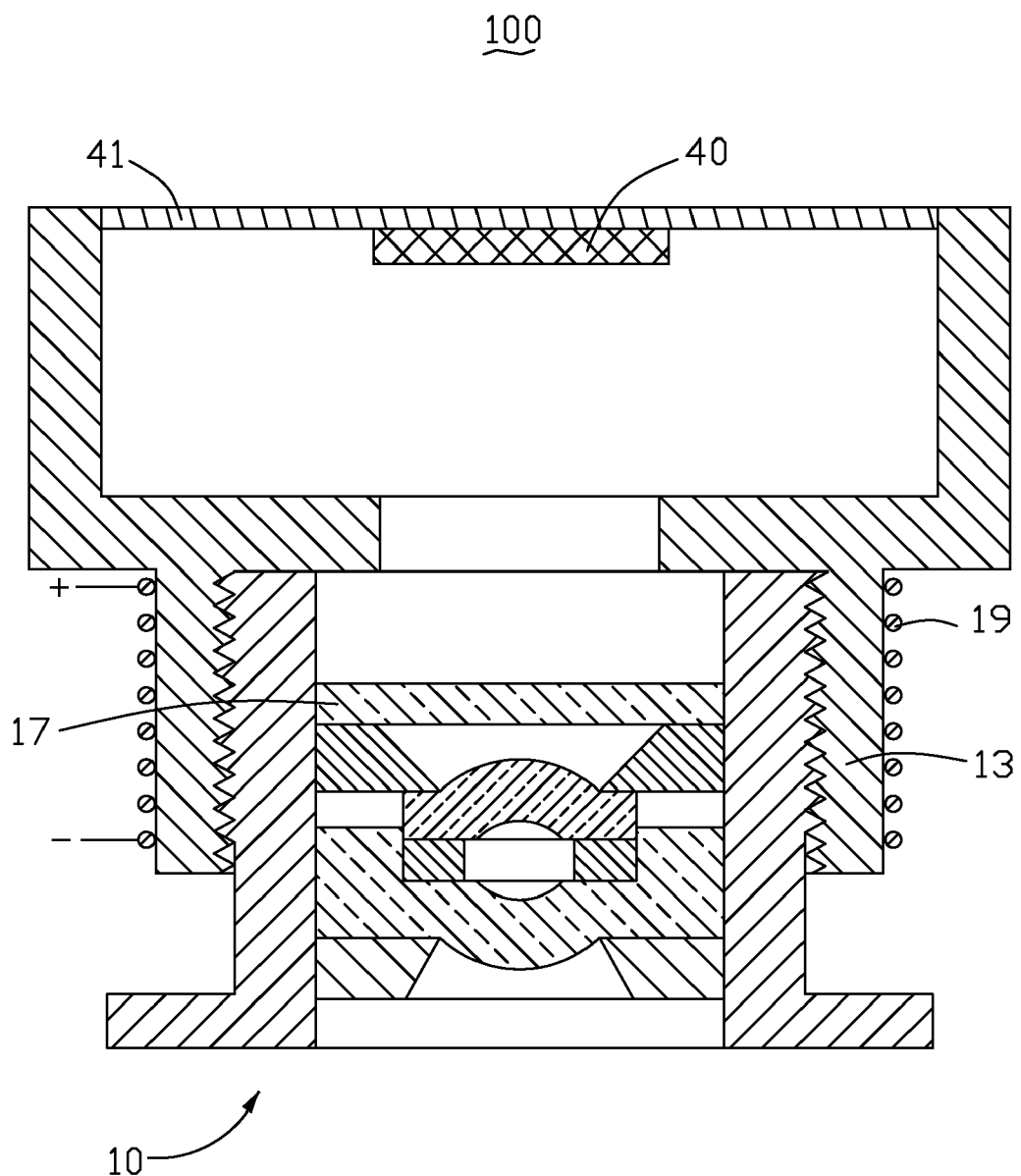
FIG. 5 is a schematic, cross-sectional view of an imaging system having the lens module assembly of FIG. 1.

Moreover, the present lens module assemblies 10, 20, 30 can be applied in various imaging systems used in a variety of fields, for example, digital cameras, mobile phones, cars. FIG. 5 illustrates an imaging system 100 having the lens module assembly 10. In addition to the lens module assembly 10, the imaging system 100 includes an image sensor 40. The image sensor 40 is disposed adjacent to the lens holder 13 and is supported on a base 41 behind the optical filter 17. The image sensor 40 may transform light signals to electronic signals. The image sensor 40 is usually a charge-coupled device (CCD) or a complementary metal-oxide semiconductor (CMOS).

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A lens module assembly comprising:
   a lens module comprising a lens barrel and a lens holder threadedly receiving the lens barrel therein; and
   a temperature regulator disposed on and around a selected one of an outer wall of the lens barrel, the lens holder, and a combination of the outer wall of the lens barrel and the lens holder, the temperature regulator being configured for keeping temperature of the lens module within a predetermined range so as to ensure image quality of the lens module.

2. The lens module assembly as claimed in claim 1, wherein the temperature regulator comprises a heating member selected from the group consisting of: an electronic heater, a heating sheet, and a heating conduit.

3. The lens module assembly as claimed in claim 2, wherein the heating member is an electronic heater and the electronic heater comprises a plurality of resistors coiled around the selected one of the outer wall of the lens barrel, the lens holder, and the combination of the outer wall of the lens barrel and the lens holder.

4. The lens module assembly as claimed in claim 2, wherein the heating member is a heating sheet and the heating sheet is attached to the selected one of the outer wall of the lens barrel, the lens holder, and the combination of the outer wall of the lens barrel and the lens holder.

5. The lens module assembly as claimed in claim 2, wherein the heating member is a heating conduit and the heating conduit is a snake-shaped conduit coiled around the selected one of the outer wall of the lens barrel, the lens holder, and the combination of the outer wall of the lens barrel and the lens holder, an amount of liquid media circulating in the heating conduit to exchange heat with the selected one of the outer wall of the lens barrel, the lens holder, and the combination of the outer wall of the lens barrel and the lens holder.

6. The lens module assembly as claimed in claim 1, wherein the predetermined temperature range is from about 20° C. to about 60° C.

7. The lens module assembly as claimed in claim 1, further comprising a temperature sensor electrically connected to the temperature regulator and thermally coupled to the lens module, the temperature sensor being configured for detecting the temperature of the lens module and transmitting an operating instruction to the temperature regulator based on the detected temperature of the lens module.

8. The lens module assembly as claimed in claim 1, wherein the lens barrel and the lens holder are made of thermally conductive material selected from the group consisting of: copper, aluminum, carbon fiber, and polymer doped with thermally conductive metal.

9. An imaging system comprising:
  a lens module comprising a lens barrel and a lens holder threadedly receiving the lens barrel therein;
  a temperature regulator disposed on and around a selected one of an outer wall of the lens barrel, the lens holder, and a combination of the outer wall of the lens barrel and the lens holder, the temperature regulator being configured for maintaining a temperature of the lens module in a predetermined range so as to ensure image quality of the lens module; and
  an image sensor disposed adjacent to the lens module.

10. The imaging system as claimed in claim 9, wherein the temperature regulator includes a heating member selected from the group consisting of: an electronic heater, a heating sheet, and a heating conduit.

11. The imaging system as claimed in claim 10, wherein the heating member is an electronic heater and the electronic heater comprises a plurality of resistance coils coiled around the selected one of the outer wall of the lens barrel, the lens holder, and the combination of the outer wall of the lens barrel and the lens holder.

12. The imaging system as claimed in claim 10, wherein the heating member is a heating sheet and the heating sheet is attached to the selected one of the outer wall of the lens barrel, the lens holder, and the combination of the outer wall of the lens barrel and the lens holder.

13. The imaging system as claimed in claim 10, wherein the heating member is a heating conduit and the heating conduit is a snake-shaped conduit coiled around the selected one of the outer wall of the lens barrel, the lens holder, and the combination of the outer wall of the lens barrel and the lens holder, an amount of liquid media circulating in the heating conduit to exchange heat with the selected one of the outer wall of the lens barrel, the lens holder, and the combination of the outer wall of the lens barrel and the lens holder.

14. The imaging system as claimed in claim 9, wherein the predetermined temperature range is from about 20° C. to about 60° C.

15. The imaging system as claimed in claim 9, further comprising a temperature sensor electrically connected to the temperature regulator and thermally coupled to the lens module, the temperature sensor being configured for detecting the temperature of the lens module and transmitting an operating instruction to the temperature regulator based on the detected temperature of the lens module.

16. The imaging system as claimed in claim 9, wherein the image sensor is one of a charge-coupled device and a complementary metal-oxide semiconductor.

17. A lens module assembly comprising:
  a lens module comprising a lens barrel and a lens holder threadedly receiving the lens barrel therein; and
  a temperature regulator disposed on the lens module, the temperature regulator being configured for keeping temperature of the lens module within a predetermined range so as to ensure image quality of the lens module;
  wherein the temperature regulator comprises a heating member selected from the group consisting of an electronic heater and a heating conduit, the electronic heater comprises a plurality of resistors coiled around the lens module, the heating conduit is a snake-shaped conduit coiled around the lens module with an amount of liquid media circulating in the heating conduit to exchange heat with the lens module.

18. The lens module assembly as claimed in claim 17, further comprising a temperature sensor electrically connected to the temperature regulator and thermally coupled to the lens module, the temperature sensor being configured for detecting the temperature of the lens module and transmitting an operating instruction to the temperature regulator based on the detected temperature of the lens module.

19. The lens module assembly as claimed in claim 17, wherein the lens barrel and the lens holder are made of thermally conductive material selected from the group consisting of copper, aluminum, carbon fiber, and polymer doped with thermally conductive metal.

\* \* \* \* \*